United States Patent
Behm et al.

(10) Patent No.: US 12,153,558 B1
(45) Date of Patent: Nov. 26, 2024

(54) HASH BASED ROLLUP WITH PASSTHROUGH

(71) Applicant: Databricks, Inc., San Francisco, CA (US)

(72) Inventors: Alexander Behm, Lafayette, CA (US); Ankur Dave, Berkeley, CA (US)

(73) Assignee: Databricks, Inc., San Francisco, CA (US)

( * ) Notice: Subject to any disclaimer, the term of this patent is extended or adjusted under 35 U.S.C. 154(b) by 74 days.

(21) Appl. No.: 18/162,093

(22) Filed: Jan. 31, 2023

Related U.S. Application Data

(63) Continuation of application No. 17/099,467, filed on Nov. 16, 2020, now Pat. No. 11,675,767.

(51) Int. Cl.
*G06F 16/00* (2019.01)
*G06F 16/13* (2019.01)
*G06F 16/22* (2019.01)
*G06F 16/242* (2019.01)
*G06F 16/2455* (2019.01)
*G06F 16/28* (2019.01)

(52) U.S. Cl.
CPC ........ *G06F 16/2255* (2019.01); *G06F 16/134* (2019.01); *G06F 16/2272* (2019.01); *G06F 16/244* (2019.01); *G06F 16/24556* (2019.01); *G06F 16/285* (2019.01)

(58) Field of Classification Search
CPC ............... G06F 16/134; G06F 16/2255; G06F 16/2272; G06F 16/244; G06F 16/24556; G06F 16/285
See application file for complete search history.

(56) References Cited

U.S. PATENT DOCUMENTS

| | | |
|---|---|---|
| 6,775,682 B1 | 8/2004 | Ballamkonda et al. |
| 9,886,474 B2 | 2/2018 | De Smet et al. |
| 10,055,480 B2 | 8/2018 | Gaumnitz et al. |
| 2006/0116989 A1 | 6/2006 | Bellamkonda et al. |
| 2014/0052726 A1* | 2/2014 | Amberg ............... G06F 16/244 707/E17.046 |
| 2014/0214800 A1 | 7/2014 | Liang et al. |
| 2014/0351239 A1 | 11/2014 | Davis et al. |

(Continued)

OTHER PUBLICATIONS

United States Office Action, U.S. Appl. No. 17/099,467, filed Sep. 29, 2022, 10 pages.

*Primary Examiner* — Diedra McQuitery
(74) *Attorney, Agent, or Firm* — Fenwick & West LLP

(57) ABSTRACT

A system includes a plurality of computing units. A first computing unit of the plurality of computing units comprises: a communication interface configured to receive an indication to roll up data in a data table; and a processor coupled to the communication interface and configured to: build a preaggregation hash table based at least in part on a set of columns and the data table by aggregating input rows of the data table; for each preaggregated hash table entry of the preaggregated hash table: provide the preaggregated hash table entry to a second computing unit of the plurality of computing units based at least in part on a distribution hash value; receive a set of received entries from computing units of the plurality of computing units; and build an aggregation hash table based at least in part on the set of received entries by aggregating the set of received entries.

20 Claims, 12 Drawing Sheets

(56) References Cited

U.S. PATENT DOCUMENTS

| | | |
|---|---|---|
| 2015/0220600 A1* | 8/2015 | Bellamkonda ........ G06F 16/245 |
| | | 707/747 |
| 2016/0378827 A1 | 12/2016 | Bondalapati et al. |
| 2017/0024435 A1 | 1/2017 | Kociubes et al. |
| 2017/0091271 A1 | 3/2017 | Attaluri et al. |
| 2017/0228373 A1 | 8/2017 | Mueller et al. |
| 2018/0276289 A1* | 9/2018 | Gross .................... G06F 16/285 |
| 2020/0349165 A1 | 11/2020 | Park et al. |
| 2021/0073233 A1 | 3/2021 | Chavan et al. |
| 2021/0224257 A1 | 7/2021 | Fender et al. |
| 2021/0263930 A1 | 8/2021 | Fender et al. |
| 2022/0092069 A1* | 3/2022 | Hartsing ........... G06F 16/24544 |

\* cited by examiner

| Country | State/Province | City | Value |
|---------|----------------|-----------|-------|
| USA | NY | NY | 99 |
| USA | NY | NY | 23 |
| USA | NY | Rochester | 34 |
| USA | CA | SF | 92 |
| USA | CA | LA | 33 |
| USA | CA | LA | 44 |
| USA | CA | LA | 76 |
| USA | CA | Sacramento | 22 |
| Canada | BC | Vancouver | 89 |
| Canada | Ontario | Toronto | 62 |
| Canada | Ontario | Toronto | 52 |
| Canada | Ontario | Ottawa | 12 |

⎯ 300

GROUP BY ROLLUP (Country, State/Province, City)

| Country | State/Province | City | Value |
|---------|----------------|-----------|-------|
| USA | NY | NY | 122 |
| USA | NY | Rochester | 34 |
| USA | CA | SF | 92 |
| USA | CA | LA | 153 |
| USA | CA | Sacramento | 22 |
| Canada | BC | Vancouver | 89 |
| Canada | Ontario | Toronto | 114 |
| Canada | Ontario | Ottawa | 12 |
| USA | NY | NONE | 156 |
| USA | CA | NONE | 267 |
| Canada | BC | NONE | 89 |
| Canada | Ontario | NONE | 126 |
| USA | NONE | NONE | 423 |
| Canada | NONE | NONE | 215 |
| NONE | NONE | NONE | 638 |

HASH BASED ROLLUP WITH PASSTHROUGH

CROSS-REFERENCE TO RELATED APPLICATIONS

The present application is a continuation of U.S. application Ser. No. 17/099,467 filed on Nov. 16, 2020, which is incorporated by reference in its entirety.

BACKGROUND OF THE INVENTION

A cluster database system executes database commands on stored database data. Systems for storing and processing large quantities of data typically store and process the data using a cluster system—for example, a cluster system comprising a plurality of computing systems each for storing and processing a portion of the data. A common database command expected by database users to be implemented by a database system is GROUP BY ROLLUP. The GROUP BY ROLLUP command is executed with an input data table (e.g., organized as a set of rows and columns) and an ordered list of columns (e.g., an ordered list of a subset of the data table columns)—for example the list [c1, c2, c3, c4]. The GROUP BY ROLLUP command outputs a data table comprising the input data table having undergone a set of transformations. The output data table first comprises the input table grouped by all columns in the list (e.g., [c1, c2, c3, c4]). For example, all rows of the input table comprising identical values for the columns c1, c2, c3, and c4 are grouped into a single row. The output data table then comprises the input table grouped by all columns in the list but the last column (e.g., [c1, c2, c3]). For example, all rows of the input table comprising identical values for the columns c1, c2, and c3 are grouped into a single row. The process is repeated as columns are removed from the end of the list until the list is emptied. A traditional implementation of GROUP BY ROLLUP duplicates each input row for each output grouping set (e.g., once for each column in the input column list), nulls the data values of each column not used for the grouping set, and counts identical rows. Other traditional algorithms require sorting the entire input data set. For large data sets, these algorithms are not feasible, creating a problem where a space-efficient algorithm is required.

BRIEF DESCRIPTION OF THE DRAWINGS

Various embodiments of the invention are disclosed in the following detailed description and the accompanying drawings.

FIG. 3A is a diagram illustrating an embodiment of a GROUP BY ROLLUP operation.

DETAILED DESCRIPTION

Figure 1:
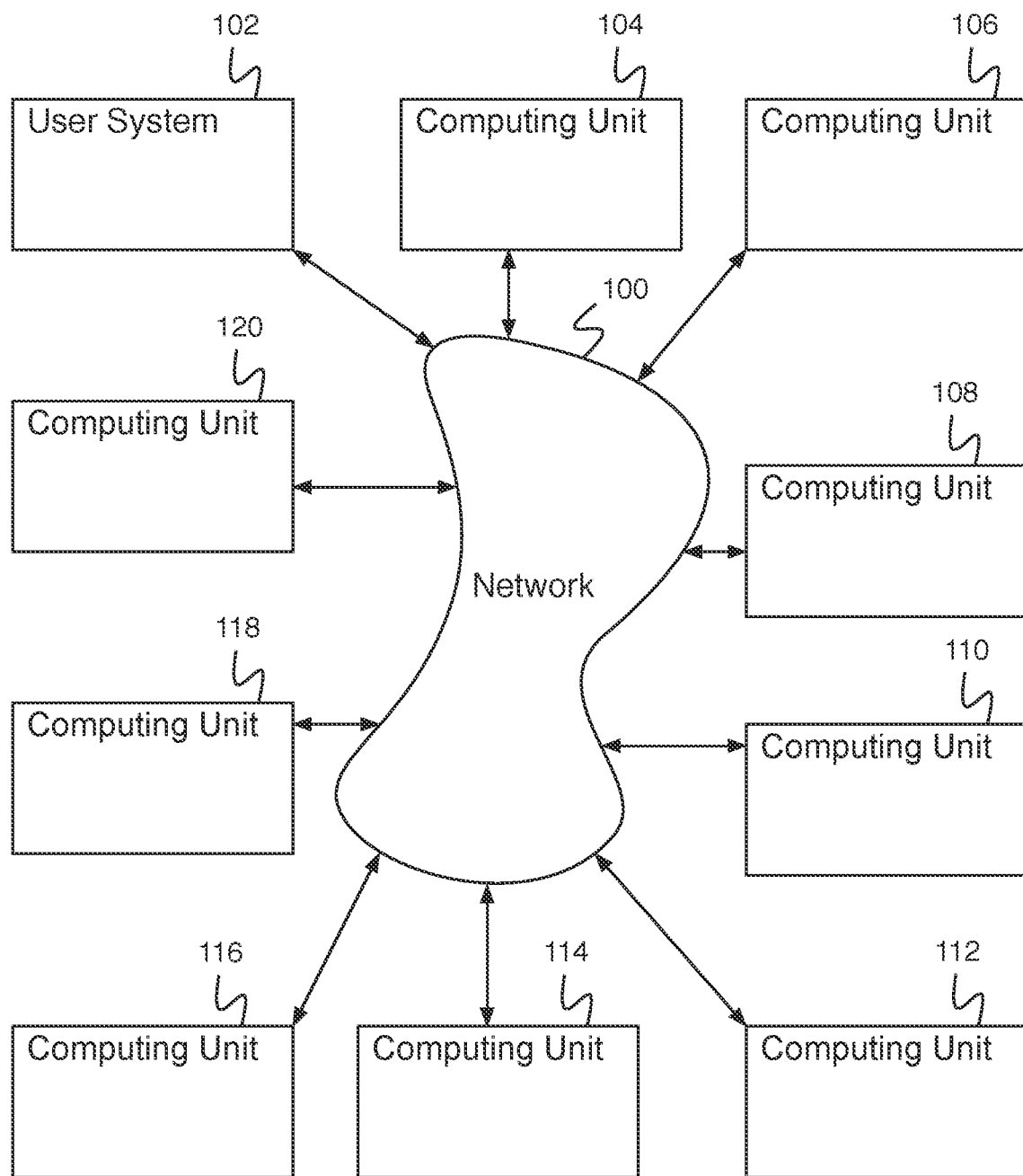
FIG. 1 is a block diagram illustrating an embodiment of a computing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for hash based rollup with pass through is disclosed. The system comprises a plurality of computing units, wherein a first computing unit of the plurality of computing units comprises a communication interface and a processor. The communication interface is configured to receive an indication to roll up data in a data table. The processor is coupled to the communication interface and configured to: 1) build a preaggregation hash table based at least in part on a set of columns and the data table by aggregating input rows of the data table; 2) for each preaggregated hash table entry of the preaggregated hash table, provide the preaggregated hash table entry to a second computing unit of the plurality of computing units based at least in part on a distribution hash value; 3) receive a set of entries from computing units of the plurality of computing units; and 4) build an aggregation hash table based at least in part on the set of received entries by aggregating the set of received entries.

A computing system for performing database operations comprises a system for performing a GROUP BY ROLLUP operation. For example, the system comprises a system for performing a GROUP BY ROLLUP operation on a large data table. In various embodiments, the computing system comprises one or more of the following: a cluster system with multiple computing nodes, a cluster system with multiple computing nodes with multiple computing units (e.g., virtual machines) on some/each of the multiple computing nodes, a single computer system, a single computer system with multiple computing units (e.g., virtual machines) on the computer system, a computing system with one or more processing cores (e.g., multiple cores in one or more processors), or any other appropriate hardware or software computing units. The computing system comprises a plurality of cluster computing units, each unit initially storing a portion of the data table. After the GROUP BY ROLLUP operation is complete, each unit will store a portion of the output data table. The process works by executing a repeating series of steps comprising local aggregation, data exchange between units, and final aggregation.

A command to execute the GROUP BY ROLLUP is received, indicating a table stored by the computing system and a set of columns for rollup. At a unit of the computing system, each stored row of the input data table is entered into a preaggregation hash table. A hash table comprises a set of entries, each entry comprising a key and an associated value. Each preaggregation hash table entry comprises a key built from the values in the row corresponding to the columns of the set of columns, and a value corresponding to the row data. For example, in the event two rows have matching preaggregation hash table keys (e.g., their values in the row corresponding to the columns of the set of columns match), the two rows are aggregated together and the aggregation values are stored in the hash table. In some embodiments, the preaggregation process and the hash table build occur simultaneously (or in some cases not simultaneously). This simultaneous or not simultaneous build allows for avoiding storing of the multiple rows with the same key, which saves memory. Instead, as each row is received, the corresponding hash table entry is looked up or inserted in the corresponding hash table entry if necessary, then the aggregation value is updated within that entry to reflect the new row. The preaggregation process aggregates input rows with matching preaggregation hash table keys. The aggregation values comprise any appropriate aggregation value—for example, count, sum, average, etc. Each node of the cluster computing system now stores a preaggregated hash table comprising a set of keys associated with aggregated row data.

In order to aggregate the data stored by the separate preaggregation hash tables (e.g., the preaggregation hash tables on separate nodes), matching data (e.g., data with the same preaggregation hash table key) needs to be moved to be on a single computing unit. A data exchange process is used to redistribute the data among the computing units. On a unit of the computing system, each entry is selected from the preaggregation hash table, first a value for hash function of its key is computed and second the modulo of the hash function value by the number of computing system units is computed. This computation yields a computing system unit index value guaranteeing that all hash table entries are associated with the same cluster system node. The preaggregation hash table entry is then provided to the computing system unit corresponding to the computed computing system unit index value. As hash table entries are received by a computing system unit, they are added to a final aggregation hash table (e.g., wherein the hash table entry addition process is similar to the preaggregation hash table entry addition process). In some embodiments, when all preaggregation hash table entries have been provided to the appropriate computing system, the preaggregation hash table is deleted from memory. A final aggregation step is then performed on the final aggregation hash table, combining entry value data associated with the same hash key into a single entry including an aggregation value. In some embodiments, once the final aggregation hash table has been aggregated, its contents are written to a nonvolatile memory to be used as part of the final output of the function. In some embodiments, the final aggregation hash table is consumed directly by another process.

The process of preaggregation is executed a number of times corresponding to the number of columns in the set of columns for rollup. After each iteration is complete, the last column of the set of columns is removed. The preaggregation process is executed again, starting with the aggregated final aggregation hash table. For example, each preaggregation hash table entry in the first iteration was associated with a key built from N values, where N is the number of columns in the initial set of columns. Each preaggregation hash table entry in the second iteration is associated with N−1 values, wherein the value associated with the last column of the set of columns is no longer used. As a result, data entries in the first iteration that differed only in the final column (e.g., the column no longer used in key creation) are aggregated together in the second iteration. In some embodiments, once the preaggregation hash table for the second iteration is completed, the final aggregation hash table from the first iteration is no longer needed and is deleted from memory. In some embodiments, in each iteration, once a final aggregation hash table is completed, its contents are written to nonvolatile memory. For example, the final aggregation hash table contents are appended to the previous final aggregation hash table contents output after previous iterations. Once enough iterations are performed that all columns have been removed from the set of columns for rollup, a final aggregation is performed, aggregating all rows into a single aggregation value. Regardless of the number of rollup columns, only one exchange and final aggregation is performed. To achieve this, a column is appended to the output of each preaggregation that uniquely identifies the preaggregation. For example, the preaggregation over [c1, c2, c3, c4] is augmented with a column with value 0, while the preaggregation over [c1, c2, c3] is augmented with a column with value 1. This allows the final aggregation to distinguish between the output of each preaggregation.

As an additional optimization, at each iteration it is determined whether the preaggregation step yields a performance gain. For example, the preaggregation step reduces the amount of data transfer between nodes in the event there are a significant number of entries in the preaggregation hash table with matching keys. The preaggregation step has its own costs, however, and there is a net cost reduction only in the event that the ratio of input rows to number of distinct keys in the hash table is above a threshold. When the preaggregation step is executed, the ratio of input rows to number of distinct keys in the hash table is monitored. In the event it is determined that the ratio of input rows to number of distinct keys in the hash table is less than a threshold (e.g., if each input row has a distinct key), the preaggregation step is stopped, and the entries in the preaggregation hash table are redistributed among the computing units without preaggregation. This optimization is referred to as passthrough.

The system for hash based rollup with passthrough improves the computing system by computing a GROUP BY ROLLUP computation on a large data set stored by a distributed computing system without requiring computationally expensive steps such as sorting or high memory usage steps such as duplicating rows. In one example, comparing the hash based rollup with passthrough algorithm to a row-duplication algorithm on a data set with 1.6 billion input rows, the total peak memory usage is reduced by 40% and the total execution time is reduced by 44%.

FIG. 1 is a block diagram illustrating an embodiment of a computing system. In some embodiments, the computing system of FIG. 1 comprises a system for hash based rollup with passthrough. In the example shown, FIG. 1 comprises network 100. In various embodiments, network 100 comprises one or more of the following: a local area network, a wide area network, a wired network, a wireless network, the Internet, an intranet, a storage area network, a communication bus, or any other appropriate communication network. User system 102, computing unit 104, computing unit 106, computing unit 108, computing unit 110, computing unit 112, computing unit 114, computing unit 116, computing unit 118, and computing unit 120 communicate via network 100. In various embodiments, the computing system comprises one or more computing servers, nodes, and/or systems whether in hardware or virtual with one or more processors and/or processor cores as computing units.

User system 102 comprises a user system for use by a user. For example, user system 102 comprises a system for communication, data access, computation, etc. A user uses user system 102 to access cluster system commands utilizing the plurality of computing unit of FIG. 1, for example, to add data, remove data, modify data, process data, execute database queries, etc. The plurality of computing units of FIG. 1 comprise a cluster-based database system for storing database data (e.g., large amounts of database data, big data, etc.), processing database commands, determining computation values, executing queries, etc.

For example, a computing unit of FIG. 1 comprises a computing unit of a plurality of computing units, comprising a communication interface configured to receive an indication to roll up data in a data table and a processor coupled to the communication interface and configured to build a preaggregation hash table based at least in part on a set of columns and the data table by aggregating input rows of the data table, for each preaggregated hash table entry of the preaggregated hash table, provide the preaggregated hash table entry to a second computing node of the plurality of computing nodes based at least in part on a distribution hash value, receive a set of received entries from computing nodes of the plurality of computing nodes, and build an aggregation hash table based at least in part on the set of entries by aggregating the set of received entries.

Figure 2:
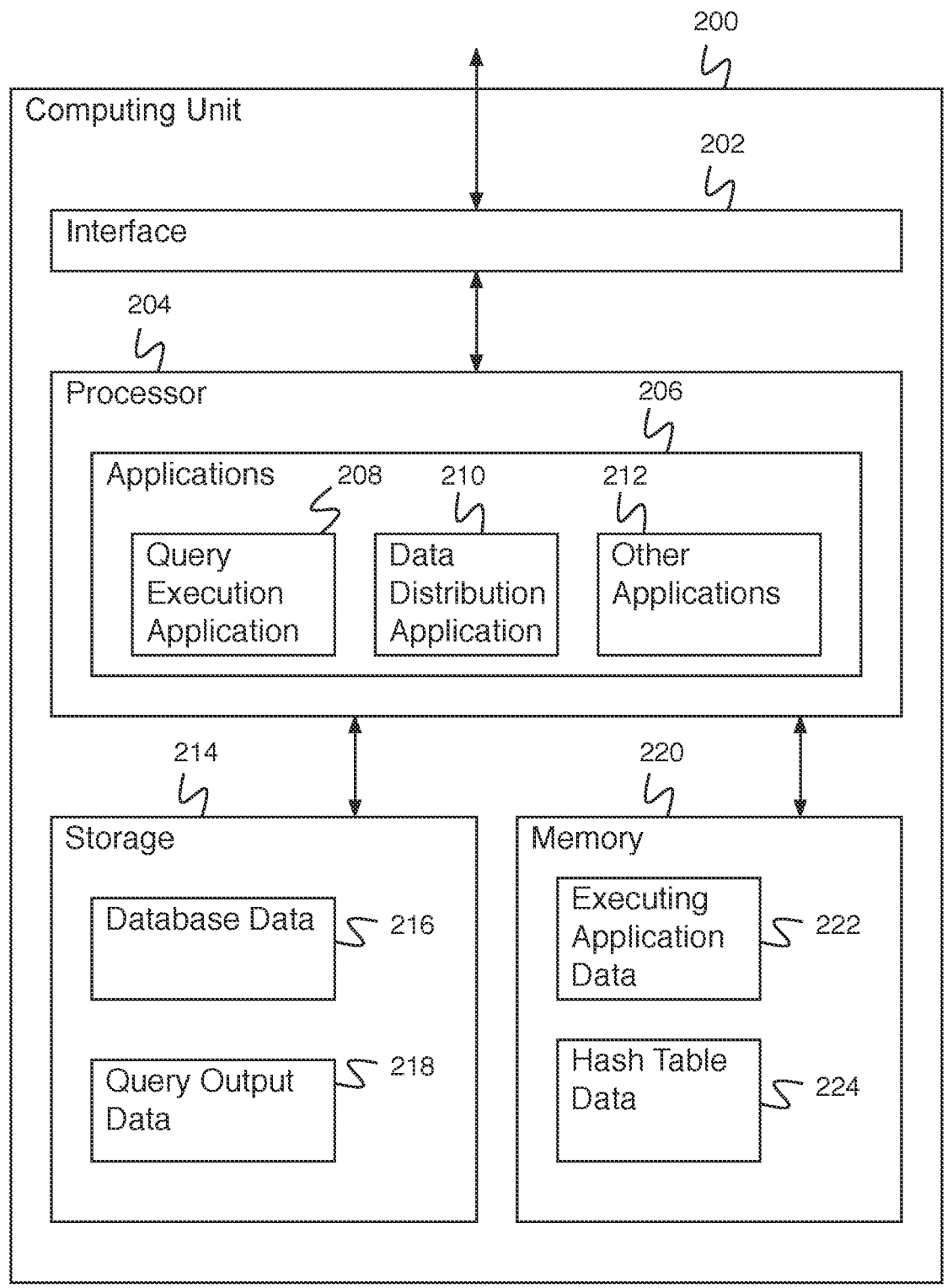
FIG. 2 is a block diagram illustrating an embodiment of a computing unit.

FIG. 2 is a block diagram illustrating an embodiment of a computing unit. In some embodiments, computing unit 200 comprises a computing unit of the plurality of computing units of FIG. 1 (e.g., one of computing unit 104 of FIG. 1, computing unit 106 of FIG. 1, computing unit 108 of FIG. 1, computing unit 110 of FIG. 1, computing unit 112 of FIG. 1, computing unit 114 of FIG. 1, computing unit 116 of FIG. 1, computing unit 118 of FIG. 1, or computing unit 120 of FIG. 1). In the example shown, computing unit 200 comprises interface 202. For example, interface 202 comprises an interface for receiving data, providing data, receiving a request to delete or modify data, receiving a database query, providing a database query response, receiving an indication to roll up data in a data table, receiving a set of columns associated with an indication to roll up data in a data table, etc. Processor 204 comprises a processor for executing applications 206. Applications 206 comprises query execution application 208, data distribution application 210, and other applications 212. Query execution application 208 comprises an application for executing a database query (e.g., a SQL query) on stored data (e.g., database data 216). In some embodiments, query execution application 208 comprises an application for executing a database query on a database (e.g., a database in which data is stored across a plurality of computing units). Data distribution application 210 comprises an application for distributing data between computing units of a plurality of computing units. For example, data distribution application 210 comprises an application for providing data to other computing units and/or receiving data from other computing units as part of a query execution being performed by query execution application 210. Other applications 212 comprise any other appropriate applications (e.g., an index maintenance application, a communications application, a chat application, a web browser application, a document preparation application, a report preparation application, a user interface application, a data analysis application, etc.).

For example, processor 204 comprises a processor configured to build a preaggregation hash table based at least in part on a set of columns and a data table by aggregating input rows of the data table, for each preaggregated hash table entry of the preaggregated hash table, provide the preaggregated hash table entry to a second computing unit of the plurality of computing units based at least in part on a distribution hash value, receive a set of entries from computing units of the plurality of computing units, and build an aggregation hash table based at least in part on the set of entries by aggregating entries.

Storage 214 comprises database data 216 (e.g., a stored data set, a portion of a stored data set, data for executing a query) and query output data 218 (e.g., output data resulting from the execution of a query, a portion of the output data resulting from executing a query). Memory 220 comprises executing application data 224 comprising data associated with applications 226 and hash table data 224 comprising hash tables created by query execution application 208.

FIG. 3A is a diagram illustrating an embodiment of a GROUP BY ROLLUP operation. In some embodiments, the GROUP BY ROLLUP operation is executed by the cluster system of FIG. 1 or by a computing node of FIG. 1. In the example shown, data table 300 comprises an input to the GROUP BY ROLLUP operation. Data table 300 comprises a set of rows representing transactions. Each row includes values for a country, state/province, city, and transaction value. The GROUP BY ROLLUP operation is executed with a list of columns comprising "Country, State/Province, City". The GROUP BY ROLLUP operation determines a set of groupings of the input data. The first grouping of the input data is by all input columns. Rows that match for all of Country, State/Province, and City are aggregated into a single row. For example, the aggregation comprises determining a sum of the Value column. The second grouping of the input data drops the final column of the set of columns, leaving Country and State/Province. Rows that match for Country and State/Province are aggregated into a single row, summing their values. The third grouping drops the final column of the remaining columns, leaving Country. Rows that match for Country are aggregated into a single row, summing their values. The final column is dropped, leaving no remaining columns. For the final row of the output, all values of the input rows are summed. Table 302 comprises the output of the GROUP BY ROLLUP operation.

Figure 3B:
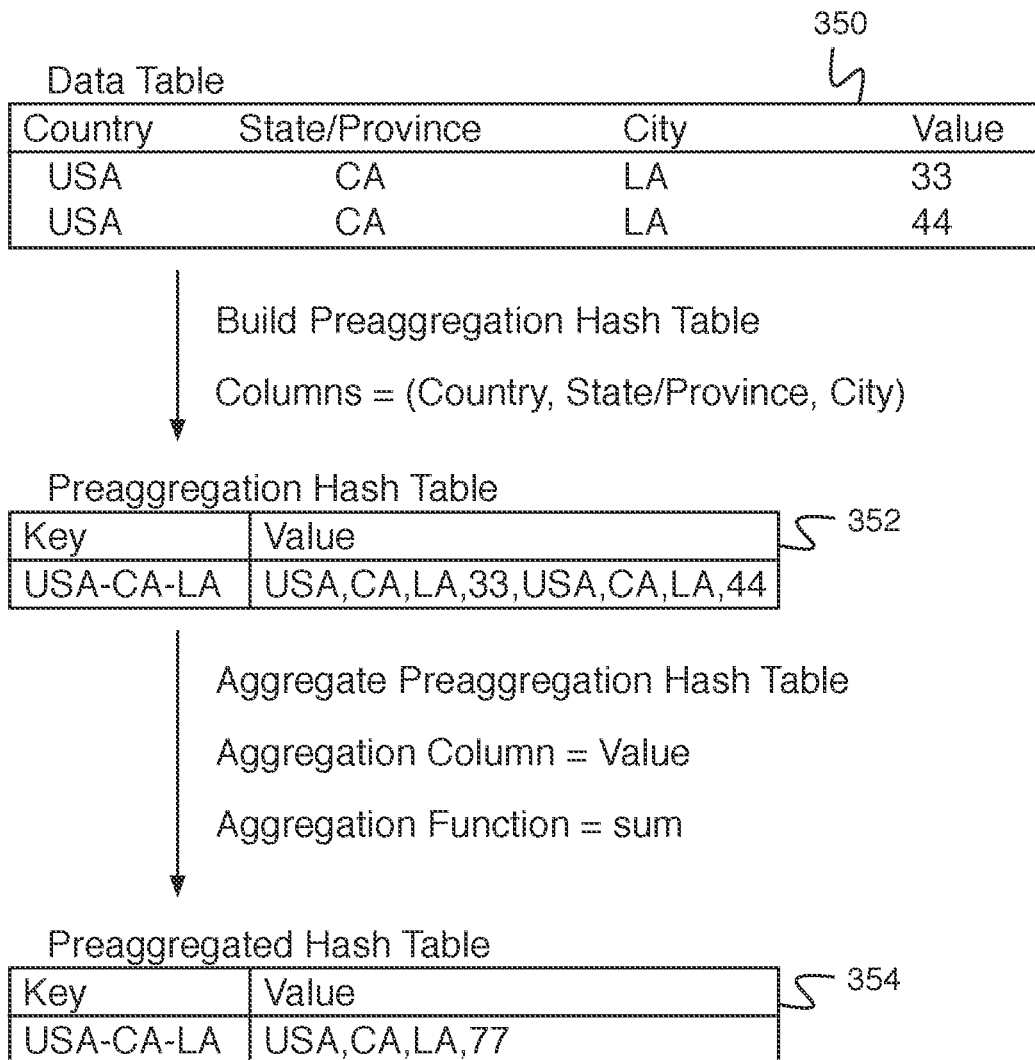
FIG. 3B is a diagram illustrating an embodiment of hash table data entry and preaggregation.

FIG. 3B is a diagram illustrating an embodiment of hash table data entry and preaggregation. In some embodiments, data table 350 comprises a portion of data table 300 of FIG. 3A. In the example shown, data from data table 350 is added to preaggregation hash table 352, using a column list comprising (Country, State/Province, City). Data table 350 comprises two rows, and each of the two rows holds the same values for Country, State/Province, and City, so only one entry is created in preaggregation hash table 352. The preaggregation hash table entry comprises a key built from the row values for the columns of the column list. In the example shown, the key comprises USA-CA-LA, combining the three row values using concatenation with a hyphen spacer. In various embodiments, the key is created by combining the row values for the columns of the column list in any appropriate way, including concatenation, hashing, javascript object notation (JSON), a custom object class, etc. The value associated with the key comprises data for the rows associated with the key. Both rows of data table 350 are associated with the key, so data from both rows becomes part of the value. In the example shown, data values are stored in a comma separated format, to make the value USA, CA, LA, 33, USA, CA, LA, 44. In some embodiments, data values used for forming the key are only stored once in the value as it is known that they are the same in each row stored associated with the key. In various embodiments, multiple rows are stored as the value in any appropriate way, including comma-separated, concatenated, JSON, a custom object class, etc. Preaggregation hash table 352 is aggregated to create preaggregated hash table 354. The entry of preaggregated hash table 354 comprises the same key as the entry of preaggregation hash table 352. The associated value in the entry of preaggregated hash table 354 comprises the two rows of data of the entry of preaggregation hash table 352 aggregated to make a single row. The specified aggregation uses the function sum over the column Value. The aggregated value comprises USA, CA, LA, 77.

Figure 4A:
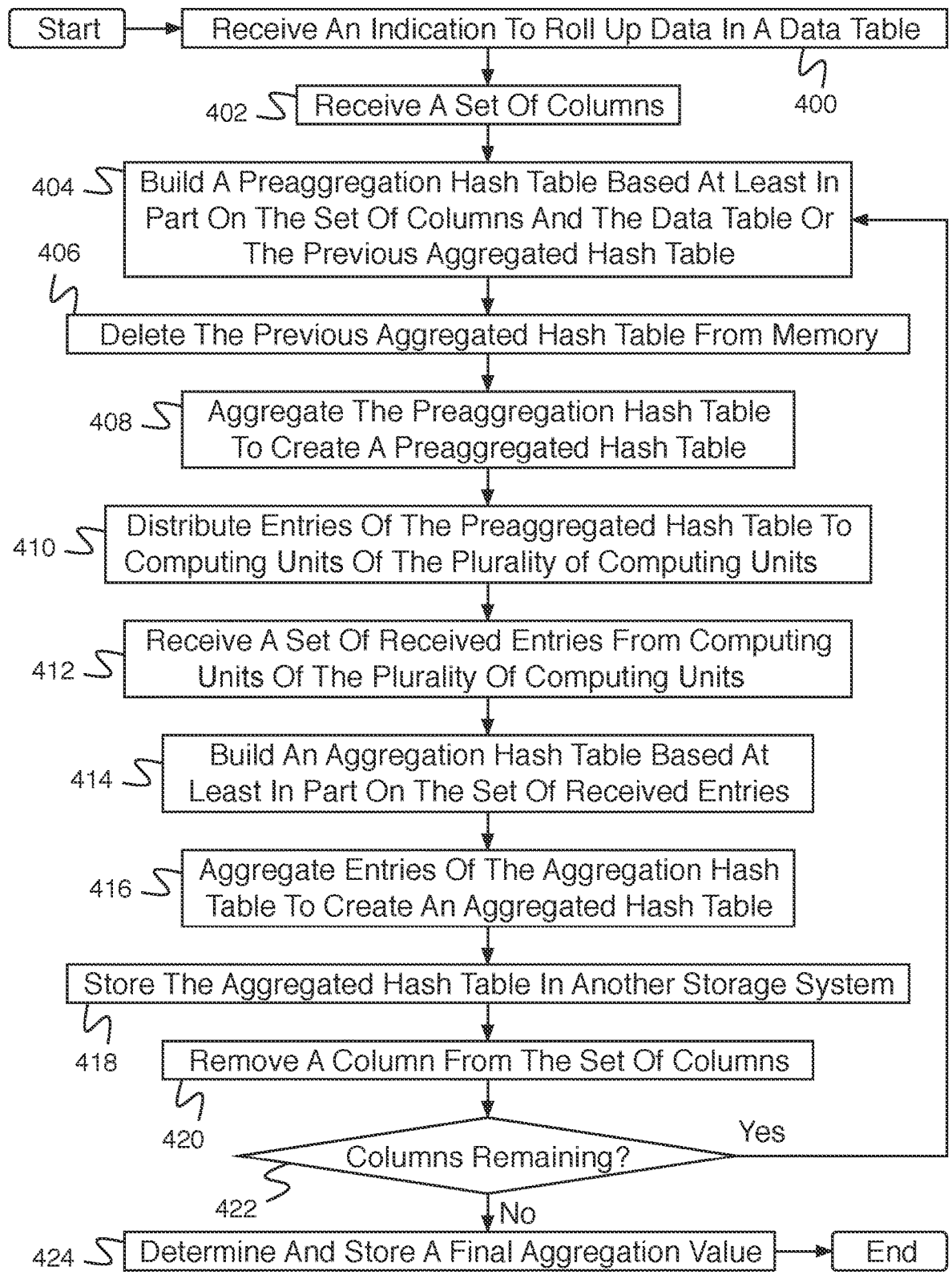
FIG. 4A is a flow diagram illustrating an embodiment of a process for a GROUP BY ROLLUP operation.

FIG. 4A is a flow diagram illustrating an embodiment of a process for a GROUP BY ROLLUP operation. In some embodiments, the process of FIG. 4A is executed by a computing unit of the plurality of computing units of FIG. 1 (e.g., one of computing unit 104 of FIG. 1, computing unit 106 of FIG. 1, computing unit 108 of FIG. 1, computing unit 110 of FIG. 1, computing unit 112 of FIG. 1, computing unit 114 of FIG. 1, computing unit 116 of FIG. 1, computing unit 118 of FIG. 1, or computing unit 120 of FIG. 1). In the example shown, in 400, an indication to roll up data in a data table is received. In 402, a set of columns is received. For example, a set of columns for data roll up is received as part of the indication to roll up data. In some embodiments, zero or more aggregation columns (e.g., a value column) and one or more aggregation functions (e.g., count, sum, average, maximum, minimum, first, last, standard deviation, variance, skewness, including exact and approximate variants as well as distinct variants of those functions (e.g., count (distinct)), etc.) are additionally received. In 404, a preaggregation hash table based at least in part on the set of columns and the data table or the previous aggregation hash table is built. For example, in a first iteration the preaggregation hash table is built from the data table, and in subsequent iterations (e.g., in a repeat of the process of preaggregation) the preaggregation hash table is built from the previous aggregated hash table from a previous iteration. A hash table comprises a set of hash table entries, each entry associated with a unique hash table key and a hash table value. Values can be accessed in the hash table using the associated key. Building a preaggregation hash table from a data table comprises determining a hash table key for each row of the data table and entering the row data in the hash table as the value associated with the hash table key. The hash table key for a given row comprises a data element built from the row values associated with each column of the set of columns. In response to multiple rows being associated with the same key, row data for each of the multiple rows are stored together as the hash table value associated with the key. Building a preaggregation hash table from a previous aggregated hash table comprises determining a hash table key for each entry of the previous aggregated hash table and entering the value 30 data associated with the entry of the previous aggregated hash table as the value associated with the hash table key. In response to multiple entries being associated with the same key, value data for each of the multiple entries are stored together as the hash table value associated with the key. In 406, the previous aggregated hash table is deleted from memory. For example, the previous aggregated hash table is deleted from memory in response to a previous aggregated hash table existing (e.g., in the event that the process is executing an iteration past the first iteration). In 408, the preaggregation hash table is aggregated to create a preaggregated hash table. For example, aggregating the preaggregation hash table comprises aggregating data from multiple data table rows or multiple previous aggregation hash table entries that are associated with a single key value. Aggregating data comprises determining an aggregation column (e.g., a "Value" column) and an aggregation function (e.g., sum) and aggregating the data from the column using the function. The preaggregated hash table created by aggregating the preaggregation hash table comprises one data row per key value, including one or more aggregation values. In some embodiments, as the aggregation process is executed, an aggregation ratio is determined. For example, the aggregation ratio comprises the ratio of input rows prior to aggregation (e.g., one or more rows per key) to output rows post aggregation (e.g., exactly one row per key). After a certain number of input rows are encountered (e.g., 1,000, 10,000, 100,000, 1,000,000, 10,000,000, etc. input rows are aggregated), the aggregation ratio is determined. In the event that the aggregation ratio is less than a threshold value (e.g., not much greater than one, 2, 3, 4, 5, etc.), the data savings of the aggregation process is insufficient, and the aggregation process is stopped and bypassed. In 410, entries of the preaggregated hash table are distributed to computing units of the plurality of computing units. For example, entries of the preaggregated hash table are distributed to computing units of the plurality of computing units based at least in part on a hash of the key value associated with the entry. In some embodiments, after the entries of the preaggregated hash table are distributed to computing units of the plurality of computing units, the preaggregated hash table is deleted from memory. In 412, a set of received entries are received from computing nodes of the plurality of computing units. For example, the set of received entries comprises entries received from other computing units distributing entries of a preaggregated hash table. In some embodiments, one or more received entries of the set of received entries comprise entries distributed in 410 (e.g., some entries stay on the same computing unit in the process of distributing the entries of the preaggregated hash table to computing units of the plurality of computing units). In 414, an aggregation hash table is built based at least in part on the set of received entries. In 416, the entries of the aggregation hash table are aggregated to create an aggregated hash table. In 418, the aggregation hash table is stored in another storage system. For example, the aggregation hash table is stored in a nonvolatile memory. In 420, a column is removed from the set of columns. For example, a column is removed from the set of columns for each repeat of a process of preaggregation, distribution, and aggregation. In 422, it is determined whether there are columns remaining. For example, determining whether there are columns remaining or whether removing the column from the set of columns caused there to be no more columns in the set of columns. In the event it is determined that there are columns remaining, control passes to 404. For example, returning to 404 once for each column of the set of columns comprises performing a set of repeats of a process of preaggregation, distribution, and aggregation. For example, repeats a process of preaggregation, distribution, and aggregation continue until all columns are removed from the set of columns. In the event it is determined that there are no columns remaining, control passes to 424. In 424, a final aggregation value is determined and stored. For example, determining a final aggregation value comprises aggregating data of the aggregated hash table (e.g., the final aggregated hash table, when no columns are remaining in the set of columns) associated with a column indicated for aggregation using an aggregation function 20) (e.g., count, sum, average, maximum, minimum, first, last, standard deviation, variance, skewness, including exact and approximate variants as well as distinct variants of those functions (e.g. count (distinct)), etc.). Storing the final aggregation value comprises storing the final aggregation value in a storage system (e.g., in a volatile memory, a non-volatile memory, a hard drive, etc.). In some embodiments, the final aggregation value is provided 25 to another system for a second aggregation step.

Figure 4B:
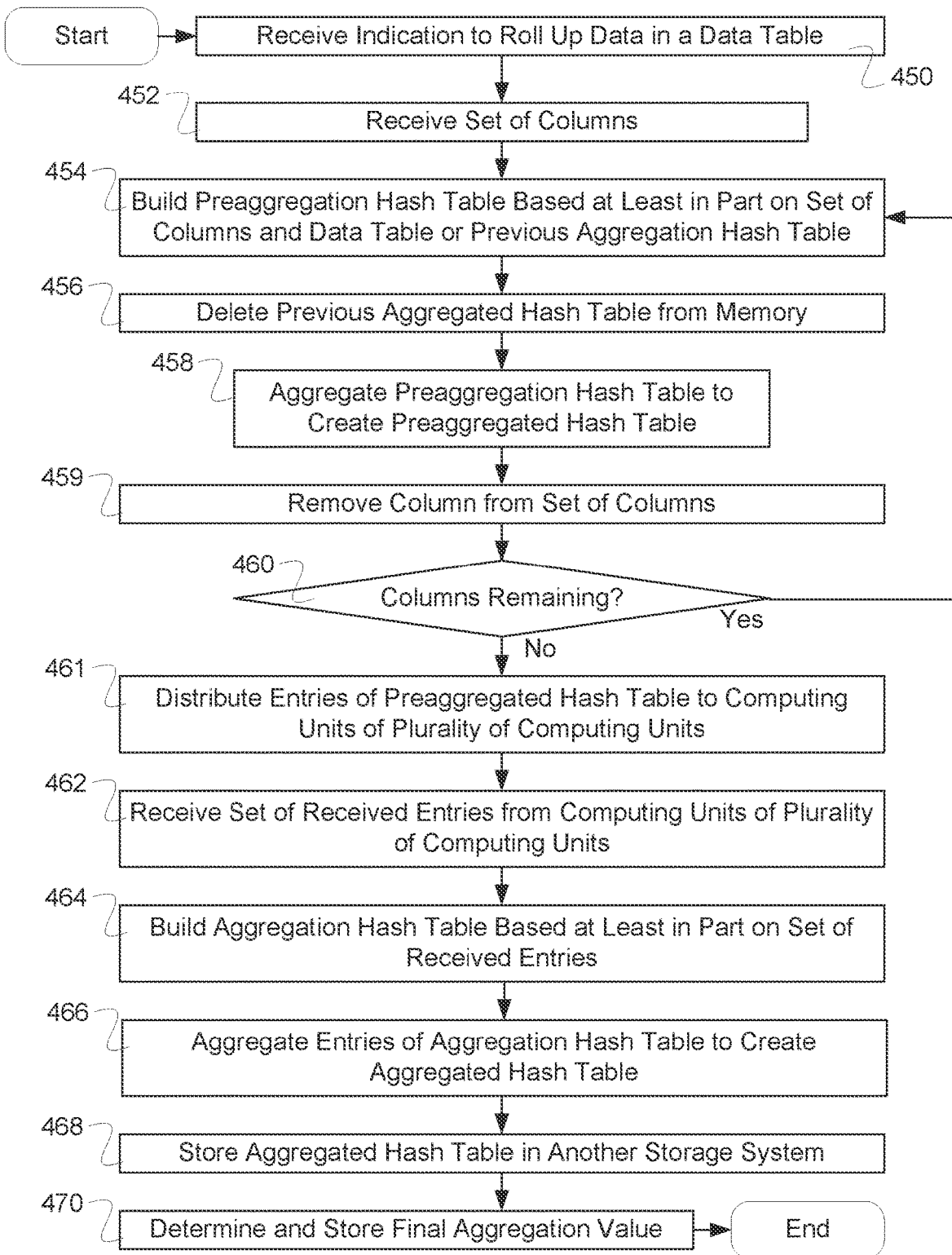
FIG. 4B is a flow diagram illustrating another embodiment of the process for a GROUP BY ROLLUP operation.

FIG. 4B is a flow diagram illustrating an embodiment of a process for a GROUP BY ROLLUP operation. In some embodiments, the process of FIG. 4B is executed by a computing unit of the plurality of computing units of FIG. 1 (e.g., one of computing unit 104 of FIG. 1, computing unit 106 of FIG. 1, computing unit 108 of FIG. 1, computing unit 110 of FIG. 1, computing unit 112 of FIG. 1, computing unit 114 of FIG. 1, computing unit 116 of FIG. 1, computing unit 118 of FIG. 1, or computing unit 120 of FIG. 1). In the example shown, in 450, an indication to roll up data in a data table is received. In 452, a set of columns is received. For example, a set of columns for data roll up is received as part of the indication to roll up data. In some embodiments, zero or more aggregation columns (e.g., a value column) and one or more aggregation functions (e.g., count, sum, average, maximum, minimum, first, last, standard deviation, variance, skewness, including exact and approximate variants as well as distinct variants of those functions (e.g. count (distinct)), etc.) are additionally received. In 454, a preaggregation hash table based at least in part on the set of columns and the data table or the previous aggregation hash table is built. For example, in a first iteration the preaggregation hash table is built from the data table, and in subsequent iterations (e.g., in a repeat of the process of preaggregation) the preaggregation hash table is built from the previous aggregated hash table from a previous iteration. A hash table comprises a set of hash table entries, each entry associated with a unique hash table key and a hash table value. Values can be accessed in the hash table using the associated key. Building a preaggregation hash table from a data table comprises determining a hash table key for each row of the data table and entering the row data in the hash table as the value associated with the hash table key. The hash table key for a given row comprises a data element built from the row values associated with each column of the set of columns. In response to multiple rows being associated with the same key, row data for each of the multiple rows are stored together as the hash table value associated with the key. Building a preaggregation hash table from a previous aggregated hash table comprises determining a hash table key for each entry of the previous aggregated hash table and entering the value data associated with the entry of the previous aggregated hash table as the value associated with the hash table key. In response to multiple entries being associated with the same key, value data for each of the multiple entries are stored together as the hash table value associated with the key. In 456, the previous aggregated hash table is deleted from memory. For example, the previous aggregated hash table is deleted from memory in response to a previous aggregated hash table existing (e.g., in the event that the process is executing an iteration past the first iteration). In 458, the preaggregation hash table is aggregated to create a preaggregated hash table. For example, aggregating the preaggregation hash table comprises aggregating data from multiple data table rows or multiple previous aggregation hash table entries that are associated with a single key value. Aggregating data comprises determining an aggregation column (e.g., a "Value" column) and an aggregation function (e.g., sum) and aggregating the data from the column using the function. The preaggregated hash table created by aggregating the preaggregation hash table comprises one data row per key value, including one or more aggregation values. In some embodiments, as the aggregation process is executed, an aggregation ratio is determined. For example, the aggregation ratio comprises the ratio of input rows prior to aggregation (e.g., one or more rows per key) to output rows post aggregation (e.g., exactly one row per key). After a certain number of input rows are encountered (e.g., 1,000, 10,000, 100,000, 1,000,000, 10,000,000, etc. input rows are aggregated), the aggregation ratio is determined. In the event that the aggregation ratio is less than a threshold value (e.g., not much greater than one, 2, 3, 4, 5, etc.), the data savings of the aggregation process is insufficient, and the aggregation process is stopped and bypassed. In 459, a column is removed from the set of columns. For example, a column is removed from the set of columns for each repeat of a process of preaggregation, distribution, and aggregation. In 460, it is determined whether there are columns remaining. For example, determining whether there are columns remaining or whether removing the column from the set of columns caused there to be no more columns in the set of columns. In the event it is determined that there are columns remaining, control passes to 454. For example, returning to 454 once for each column of the set of columns comprises performing a set of repeats of a process of preaggregation. For example, repeats a process of preaggregation until all columns are removed from the set of columns and then the process performs exchange/distribution and aggregation. In the event it is determined that there are no columns remaining, control passes to 461. In 461, entries of the preaggregated hash table are distributed to computing units of the plurality of computing units. For example, entries of the preaggregated hash table are distributed to computing units of the plurality of computing units based at least in part on a hash of the key value associated with the entry. In some embodiments, after the entries of the preaggregated hash table are distributed to computing units of the plurality of computing units, the preaggregated hash table is deleted from memory. In 462, a set of received entries are received from computing nodes of the plurality of computing units. For example, the set of received entries comprises entries received from other computing units distributing entries of a preaggregated hash table. In some embodiments, one or more received entries of the set of received entries comprise entries distributed in 460 (e.g., some entries stay on the same computing unit in the process of distributing the entries of the preaggregated hash table to computing units of the plurality of computing units). In 464, an aggregation hash table is built based at least in part on the set of received entries. In 466, the entries of the aggregation hash table are aggregated to create an aggregated hash table. In 468, the aggregation hash table is stored in another storage system. For example, the aggregation hash table is stored in a nonvolatile memory. In 470, a final aggregation value is determined and stored. For example, determining a final aggregation value comprises aggregating data of the aggregated hash table (e.g., the final aggregated hash table, when no columns are remaining in the set of columns) associated with a column indicated for aggregation using an aggregation function (e.g., count, sum, average, maximum, minimum, first, last, standard deviation, variance, skewness, including exact and approximate variants as well as distinct variants of those functions (e.g. count (distinct)), etc.). Storing the final aggregation value comprises storing the final aggregation value in a storage system (e.g., in a volatile memory, a non-volatile memory, a hard drive, etc.). In some embodiments, the final aggregation value is provided to another system for a second aggregation step.

Figure 5A:
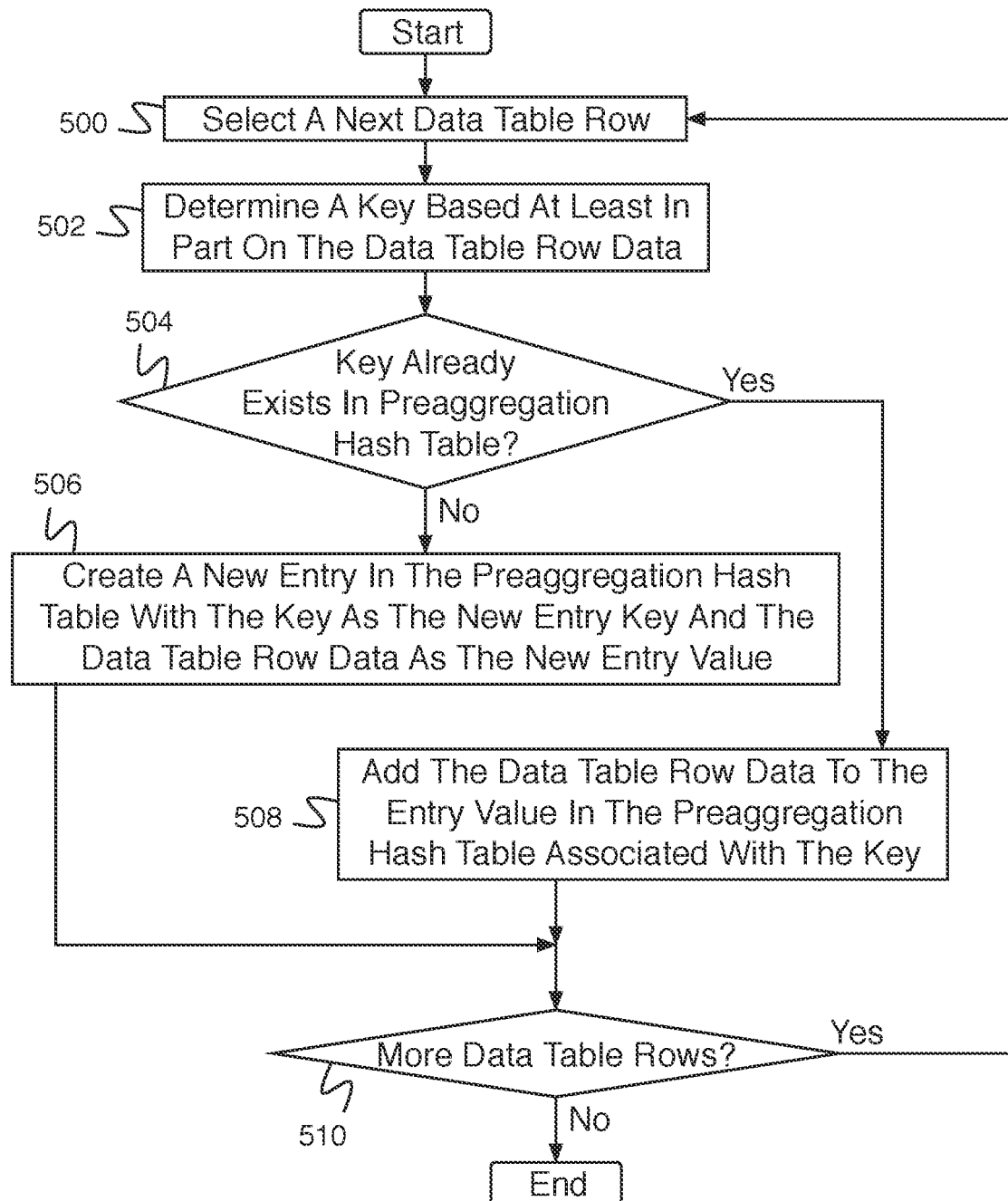
FIG. 5A is a flow diagram illustrating an embodiment of a process for building a preaggregation hash table based at least in part on a set of columns and a data table.

FIG. 5A is a flow diagram illustrating an embodiment of a process for building a preaggregation hash table based at least in part on a set of columns and a data table. In some embodiments, the process of FIG. 5A implements 404 of FIG. 4A or 454 of FIG. 4B in a first loop iteration. In the example shown, in 500, a next data table row is selected. In some embodiments, the next data table row comprises the first data table row. In 502, a key is determined based at least in part on the table row data. In 504, it is determined whether the key already exists in the preaggregation hash table. In response to determining that the key does not already exist in the preaggregation hash table, control passes to 506. In 506, a new entry in the preaggregation hash table is created with the key as the new entry key and the data table row data as the new entry value. Control then passes to 510. In response to determining in 504 that the key already exists in the preaggregation hash table, control passes to 508. In 508, the data table row data is added to the entry value in the preaggregation hash table associated with the key. For example, the data table row data is added to a data structure for storing multiple sets of row data or the data table row data is concatenated with the existing entry value. In 510, it is determined whether there are more data table rows. In response to determining that there are more data table rows, control passes to 500. In response to determining that there are not more data table rows, the process ends.

Figure 5B:
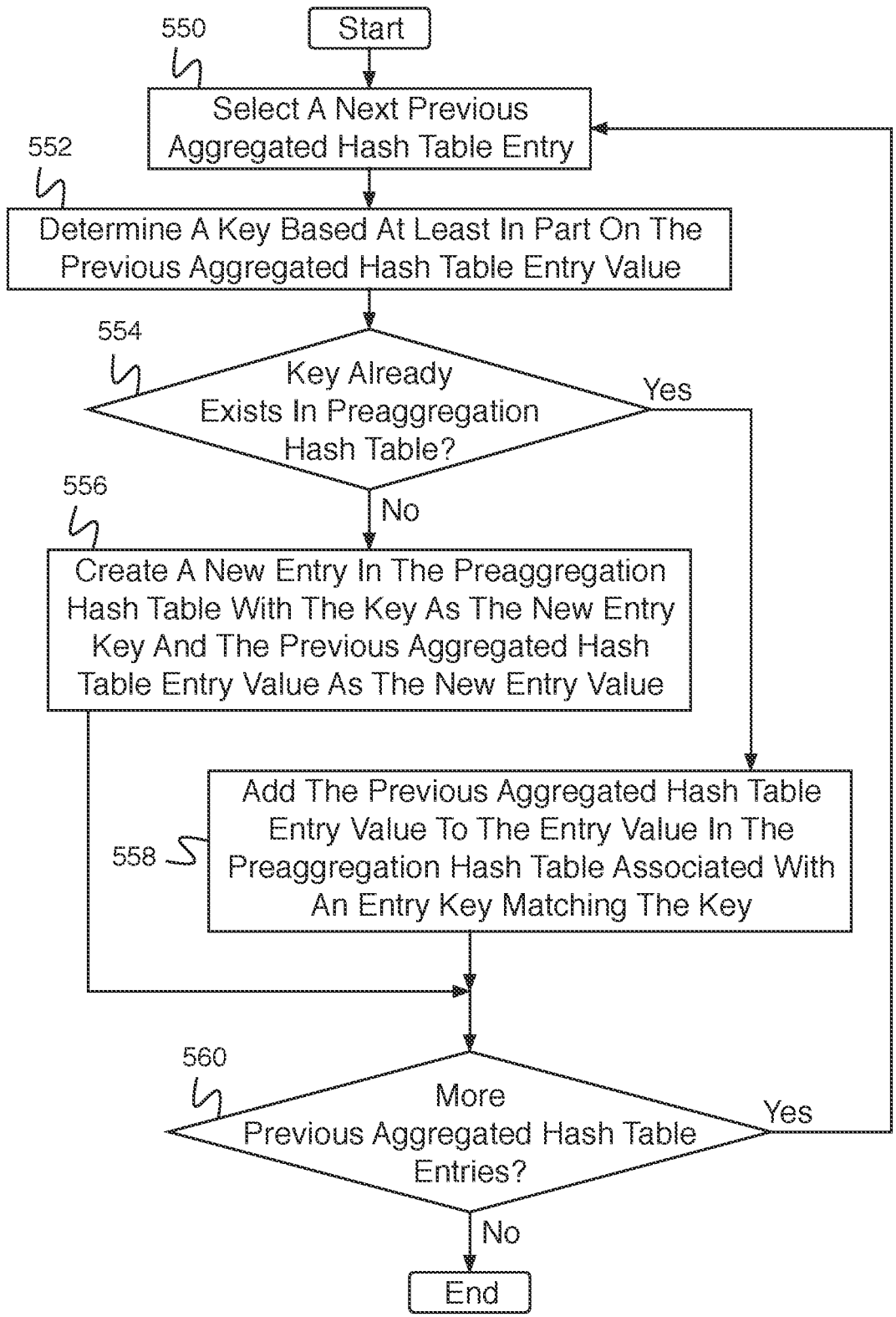
FIG. 5B is a flow diagram illustrating an embodiment of a process for building a preaggregation hash table based at least in part on a set of columns and a previous aggregation hash table.

FIG. 5B is a flow diagram illustrating an embodiment of a process for building a preaggregation hash table based at least in part on a set of columns and a previous aggregation hash table. In some embodiments, the process of FIG. 5A implements 404 of FIG. 4A or 454 of FIG. 4B in a second or subsequent loop iteration. In the example shown, in 550, a next previous aggregation hash table entry is selected. In some embodiments, the next previous aggregation hash table entry comprises the first previous aggregation hash table entry. In 552, a key is determined based at least in part on the previous aggregation hash table entry value. In 554, it is determined whether the key already exists in the preaggregation hash table. In the event it is determined that the key does not already exist in the preaggregation hash table, control passes to 556. In 556, a new entry in the preaggregation hash table is created with the key as the new entry key and the previous aggregation hash table entry value as the new entry value. Control then passes to 560. In the event it is determined in 504 that the key already exists in the preaggregation hash table, control passes to 558. In 558, the previous aggregation hash table entry value is added to the entry value in the preaggregation hash table associated with an entry key matching the key. For example, the previous aggregation hash table entry value is added to a data structure for storing multiple sets of entry value data or the previous aggregation hash table entry value is concatenated with the existing entry value. In 560, it is determined whether there are more previous aggregation hash table entries. In the event it is determined that there are more previous aggregation hash table entries, control passes to 550. In the event it is determined that there are not more previous aggregation hash table entries, the process ends.

Figure 6:
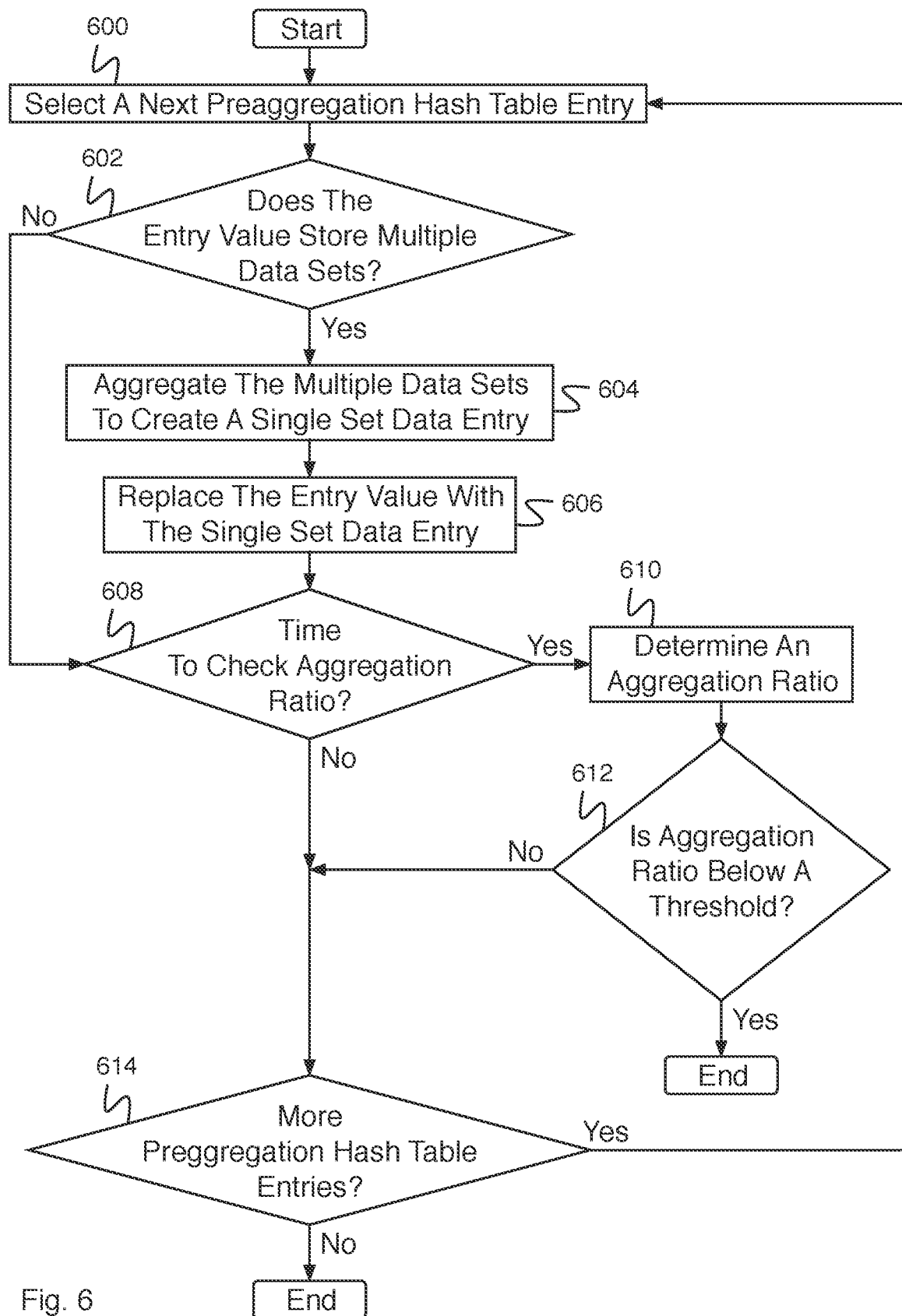
FIG. 6 is a flow diagram illustrating an embodiment of a process for aggregating a preaggregation hash table to create a preaggregated hash table.

FIG. 6 is a flow diagram illustrating an embodiment of a process for aggregating a preaggregation hash table to create a preaggregated hash table. In some embodiments, the process of FIG. 6 implements 408 of FIG. 4A or 458 of FIG. 4B. In the example shown, in 600, a next preaggregation hash table entry is selected. In some embodiments, the next preaggregation hash table entry comprises the first preaggregation hash table entry. In 602, it is determined whether the entry value stores multiple data sets. For example, whether the entry value stores data from multiple rows of an input data table or multiple entries of a previous aggregation hash table. In the event it is determined that the entry value stores multiple data sets, control passes to 604. In 604, the multiple data sets are aggregated to create a single set data entry. For example, data associated with a column indicated for aggregation is aggregated using an aggregation function and a single instance of data associated with a column of a set of columns indicated for rollup is preserved in the single set data entry. In 606, the entry value is replaced with the single set data entry. Control then passes to 608. In the event it is determined in 602 that the entry value does not store multiple data sets, control passes to 608. In 608, it is determined whether it is time to check an aggregation ratio. For example, it is time to check an aggregation ratio in the event that a predetermined number of input rows have been processed (e.g., the aggregation ratio is checked after 1,000, 10,000, 100,000, 1,000,000, 10,000,000, etc. input rows have been aggregated). In the event it is determined that it is not time to check the aggregation ratio, control passes to 614. In the event it is determined that it is time to check the aggregation ratio, control passes to 610. In 610, an aggregation ratio is determined. In some embodiments, determining an aggregation ratio comprises determining a total number of data sets processed (e.g., counting each data set stored by each entry value) divided by the number of preaggregation hash table entries processed. In 612, it is determined whether the aggregation ratio is below a threshold. In the event it is determined that the aggregation ratio is below a threshold, the process ends. In the event it is determined that the aggregation ration is not below a threshold, control passes to 614. In 614, it is determined whether there are more preaggregation hash table entries. In the event it is determined that there are more preaggregation hash table entries, control passes to 600. In the event it is determined that there are not more preaggregation hash table entries, the process ends.

Figure 7:
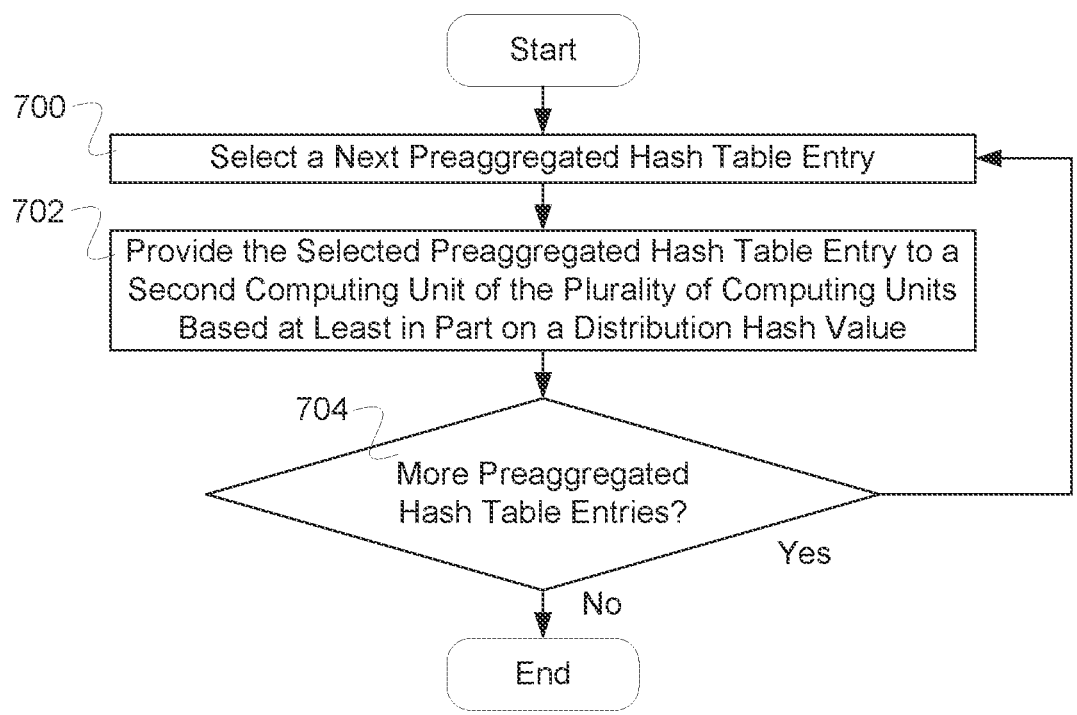
FIG. 7 is a flow diagram illustrating an embodiment of a process for distributing entries of a preaggregated hash table to computing units of a plurality of computing units.

FIG. 7 is a flow diagram illustrating an embodiment of a process for distributing entries of a preaggregated hash table to computing units of a plurality of computing units. In some embodiments, the process of FIG. 7 implements 410 of FIG. 4A or 461 of FIG. 4B. In the example shown, in 700, a next preaggregated hash table entry is selected. In some embodiments, the next preaggregated hash table entry comprises the first preaggregated hash table entry. In 702, the selected preaggregated hash table entry is provided to a second computing unit of the plurality of computing units based at least in part on a distribution hash value. For example, the second computing unit of the plurality of computing units is selected by computing a hash value from the key value associated with the preaggregated hash table entry, computing the hash value modulo the number of computing units in the plurality of computing units, and selecting the computing unit indicated by the result of the modulo function. In some embodiments, the determined computing unit comprises the current computing unit (e.g., providing the preaggregated hash table entry comprises indicating the preaggregated hash table entry as part of a set of received entries). In some embodiments, the goal of the distribution hash value is to assign keys of arbitrary size to a fixed number of computing units; To avoid imbalance in the number of rows processed by each computing unit, the distribution hash values should be computed as uniformly as possible; Any general-purpose hash function can be used to compute the distribution hash value, such as CRC or MurmurHash. The choice of hash functions balances hashing speed against uniformity; given a key, a hash function may return a hash value with more bits than necessary for the purpose of assigning the key to a computing unit. In this case, the distribution hash value can be calculated as the hash value modulo the number of computing units. In 704, it is determined whether there are more preaggregated hash table entries. In the event it is determined that there are more preaggregated hash table entries, control passes to 700. In the event it is determined that there are not more preaggregated hash table entries, the process ends.

Figure 8:
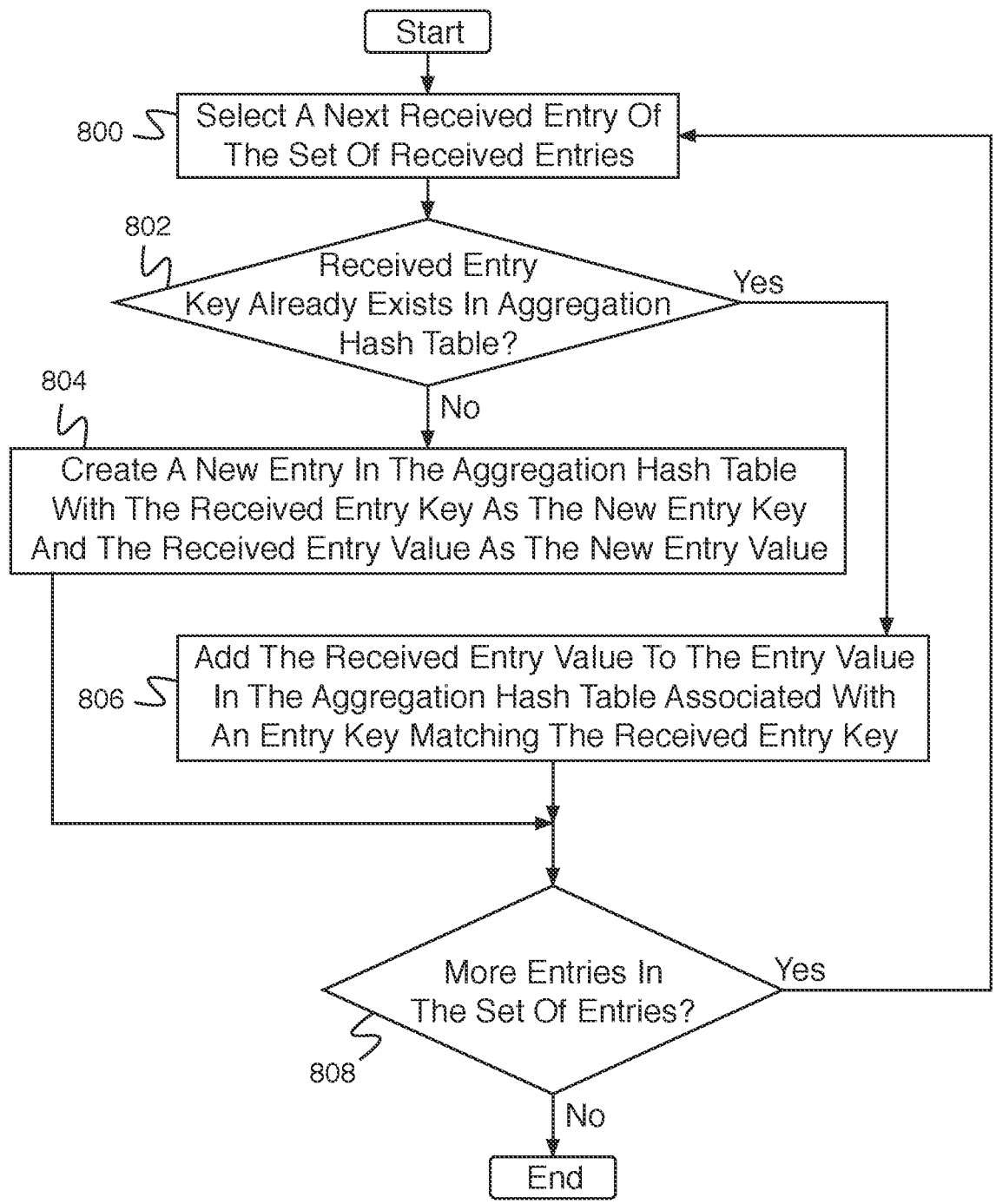
FIG. 8 is a flow diagram illustrating an embodiment of a process for building an aggregation hash table based at least in part on a set of received entries.

FIG. 8 is a flow diagram illustrating an embodiment of a process for building an aggregation hash table based at least in part on a set of received entries. In some embodiments, the process of FIG. 8 implements 414 of FIG. 4A or 464 of FIG. 4B. In the example shown, in 800, a next received entry of the set of received entries is selected. In some embodiments, the next received entry comprises the first received entry. In 802, it is determined whether the received entry key already exists in the aggregation hash table. In the event it is determined that the received entry key does not already exist in the aggregation hash table, control passes to 804. In 804, a new entry is created in the aggregation hash table with the received entry key as the new entry key and the received entry value as the new entry value. For example, a new entry is created in the aggregation hash table with the received entry key as the new entry key and the received entry value as the new entry value; the new entry in the aggregation hash table matches the received entry. Control then passes to 808. In the event it is determined in 80 that the received entry key already exists in the aggregation hash table, control passes to 806. In 806, the received entry value is added to the entry value in the aggregation hash table associated with an entry key matching the received entry key. For example, adding the received entry value to the entry value in the aggregation hash table comprises concatenating the received entry value with the value in the aggregation hash table, adding the received entry value to a data structure for storing multiple received entry values, etc. In 808, it is determined whether there are more entries in the set of entries. In the event it is determined that there are more entries in the set of entries, control passes to 800. In the event it is determined that there are not more entries in the set of entries, the process ends.

Figure 9:
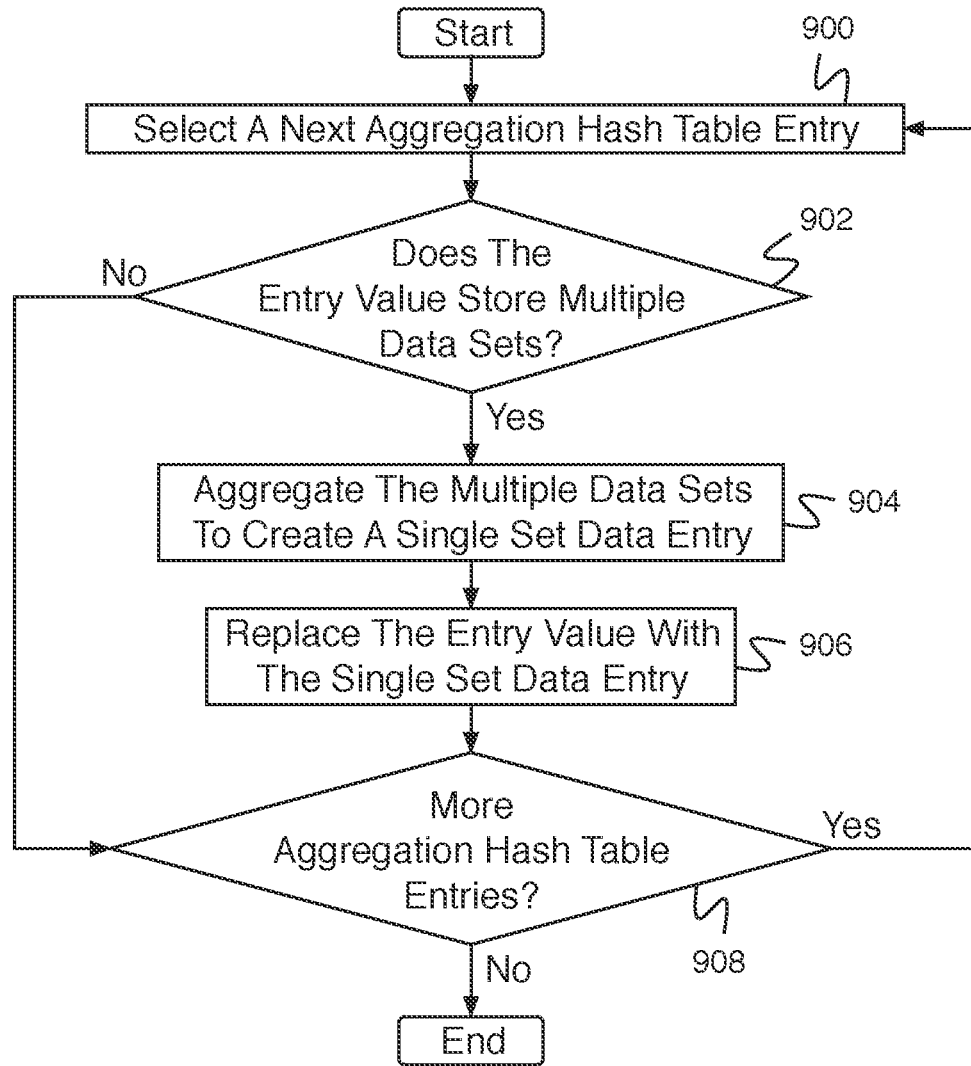
FIG. 9 is a flow diagram illustrating an embodiment of a process for aggregating entries of an aggregation hash table.

FIG. 9 is a flow diagram illustrating an embodiment of a process for aggregating entries of an aggregation hash table. In some embodiments, the process of FIG. 9 implements 416 of FIG. 4A or 466 of FIG. 4B. In the example shown, in 900, a next aggregation hash table entry is selected. In some embodiments, the next aggregation hash table entry comprises the first aggregation hash table entry. In 902, it is determined whether the entry value stores multiple data sets. In the event it is determined that the entry value does not store multiple data sets, control passes to 908. In the event it is determined that the entry value stores multiple data sets, control passes to 904. In 904, the multiple data sets are aggregated to create a single set data entry. For example, data associated with a column indicated for aggregation is aggregated using an aggregation function and data associated with a column of a set of columns indicated for rollup is preserved a single time in the single set data entry. In 906, the entry value is replaced with the single set data entry. In 908, it is determined whether there are more aggregation hash table entries. In the event it is determined that there are more aggregation hash table entries, control passes to 900. In the event it is determined that there are not more aggregation hash table entries, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a request to roll up data in a data table, the request specifying a set of columns;
repeating while the set of columns is not empty:
building a preaggregation hash table based at least in part on the set of columns of the data table,
creating a preaggregated hash table by aggregating the preaggregation hash table, and
removing a column from the set of columns;
creating an aggregated hash table by processing entries of the preaggregated hash table using a plurality of computing units; and
storing the aggregated hash table.

2. The method of claim 1, further comprising:
determining an aggregation ratio while aggregating the preaggregation hash table; and
in response to determining that the aggregation ratio is below a threshold, stopping aggregating the preaggregation hash table.

3. The method of claim 1, wherein building the preaggregation hash table based at least in part on a set of columns and the data table comprises:
for each data table row:
determining a key based at least in part on data table row data; and
responsive to determining that the key does not already exist in the preaggregation hash table, creating a new entry comprising a new entry key and a new entry value, wherein the key is the new entry key and the data table row data is the new entry value.

4. The method of claim 1, wherein creating the preaggregated hash table comprises:

responsive to determining that a hash table entry of the preaggregation hash table comprises multiple data sets:
  aggregating the multiple data sets to create a single data set entry; and
  replacing an entry value of the hash table entry with the single data set entry.

5. The method of claim 4, wherein aggregating the multiple data sets to create a single data set entry comprises aggregating data associated with a column indicated for aggregation using an aggregation function.

6. The method of claim 5, wherein the aggregation function comprises exact variants, approximate variants, and distinct variants of functions including count, sum, average, maximum, minimum, standard deviation, variance, and skewness.

7. The method of claim 1, further comprising:
  determining a final aggregation value by aggregating data of the aggregated hash table associated with a column indicated for aggregation using an aggregation function; and
  storing the final aggregation value in a storage system.

8. A computing system comprising:
  one or more computer processors; and
  one or more non-transitory computer-readable mediums storing instructions that, when executed by the one or more computer processors, cause the computing system to:
    receive a request to roll up data in a data table, the request specifying a set of columns;
    repeat while the set of columns is not empty:
      build a preaggregation hash table based at least in part on the set of columns of the data table,
      create a preaggregated hash table by aggregating the preaggregation hash table, and
      remove a column from the set of columns;
    create an aggregated hash table by processing entries of the preaggregated hash table using a plurality of computing units; and
    store the aggregated hash table.

9. The computing system of claim 8, wherein the instructions further cause the one or more computer processors to:
  determine an aggregation ratio while aggregating the preaggregation hash table; and
  in response to determining that the aggregation ratio is below a threshold, stop aggregating the preaggregation hash table.

10. The computing system of claim 8, wherein instructions for building the preaggregation hash table based at least in part on a set of columns and the data table cause the one or more computer processors to:
  for each data table row:
    determine a key based at least in part on data table row data; and
    responsive to determining that the key does not already exist in the preaggregation hash table, create a new entry comprising a new entry key and a new entry value, wherein the key is the new entry key and the data table row data is the new entry value.

11. The computing system of claim 8, wherein instructions for creating the preaggregated hash table cause the one or more computer processors to:
  responsive to determining that a hash table entry of the preaggregation hash table comprises multiple data sets:
    aggregate the multiple data sets to create a single data set entry; and
    replace an entry value of the hash table entry with the single data set entry.

12. The computing system of claim 11, wherein aggregating the multiple data sets to create a single data set entry comprises aggregating data associated with a column indicated for aggregation using an aggregation function.

13. The computing system of claim 12, wherein the aggregation function comprises exact variants, approximate variants, and distinct variants of functions including count, sum, average, maximum, minimum, standard deviation, variance, and skewness.

14. The computing system of claim 8, wherein the instructions further cause the one or more computer processors to:
  determine a final aggregation value by aggregating data of the aggregated hash table associated with a column indicated for aggregation using an aggregation function; and
  store the final aggregation value in a storage system.

15. A non-transitory computer-readable medium storing instructions that, when executed by one or more computer processors of a computing system, cause the computing system to:
  receive a request to roll up data in a data table, the request specifying a set of columns;
  repeat while the set of columns is not empty:
    build a preaggregation hash table based at least in part on the set of columns of the data table,
    create a preaggregated hash table by aggregating the preaggregation hash table, and
    remove a column from the set of columns;
  create an aggregated hash table by processing entries of the preaggregated hash table using a plurality of computing units; and
  store the aggregated hash table.

16. The non-transitory computer-readable medium of claim 15, wherein the instructions further cause the one or more computer processors to perform operations comprising:
  determine an aggregation ratio while aggregating the preaggregation hash table; and
  in response to determining that the aggregation ratio is below a threshold, stop aggregating the preaggregation hash table.

17. The non-transitory computer-readable medium of claim 15, wherein instructions for building the preaggregation hash table based at least in part on a set of columns and the data table cause the one or more computer processors to perform operations comprising:
  for each data table row:
    determine a key based at least in part on data table row data; and
    responsive to determining that the key does not already exist in the preaggregation hash table, create a new entry comprising a new entry key and a new entry value, wherein the key is the new entry key and the data table row data is the new entry value.

18. The non-transitory computer-readable medium of claim 15, wherein instructions for creating the preaggregated hash table cause the one or more computer processors to perform operations comprising:
  responsive to determining that a hash table entry of the preaggregation hash table comprises multiple data sets:
    aggregate the multiple data sets to create a single data set entry; and
    replace replacing an entry value of the hash table entry with the single data set entry.

19. The non-transitory computer-readable medium of claim 18, wherein instructions for aggregating the multiple data sets to create a single data set entry comprises aggregating data associated with a column indicated for aggregation using an aggregation function.

20. The non-transitory computer-readable medium of claim 15, wherein the instructions further cause the one or more computer processors to perform operations comprising:
- determine a final aggregation value by aggregating data of the aggregated hash table associated with a column indicated for aggregation using an aggregation function; and
- store the final aggregation value in a storage system.

\* \* \* \* \*